United States Patent Office 3,386,957
Patented June 4, 1968

3,386,957
COPOLYMERS OF α-ALKYLENARYL ETHERS WITH α-OLEFINS
Manfred Feldhoff, Oberseelbach, Albert Gustav Martin Gumboldt, Frankfurt am Main, and Jürgen Helberg, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 26, 1964, Ser. No. 392,151
Claims priority, application Germany, Aug. 28, 1963, F 40,602
4 Claims. (Cl. 260—62)

ABSTRACT OF THE DISCLOSURE

Polymerization of α-olefins with Ziegler catalysts; copolymerization of α-olefins with styrene; copolymerization of α-alkylenaryl ethers with α-olefins at low temperatures and pressures in the presence of organometal mixed catalysts obtained from halogen compounds of sub-group 4 to 8 metals and metals, alloys, hydrides or organometal compounds of elements of main or sub-groups 1 to 3 of Periodic Table.

---

The present invention relates to the copolymerization of α-alkylenaryl ethers with α-olefins.

It is known that α-olefins can be converted into high molecular weight polymers and copolymers at low pressures and low temperatures in the presence of organometal mixed catalysts known in industry as "Ziegler catalysts."

It is further known from U.S. Patent 3,070,577 that α-olefins can be copolymerized with styrene derivatives.

Now we have found that new copolymers having valuable properties can be obtained by copolymerizing α-olefins of the formula $CH_2=CH-R$ in which R represents a hydrogen atom or an alkyl, aryl or alkaryl group, with α-alkylenaryl ethers of the formula

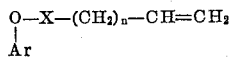

in which n is zero or a number within the range of 1 to 12, X is a direct bond or an aromatic or alicyclic ring and Ar is an aromatic nucleus, and the alicyclic and aromatic nuclei may be condensed, unsubstituted or once or several times substituted by alkyl, cycloalkyl, aryl, alkoxy or aryloxy groups, a halogen atom or a dialkylamino group, at low temperatures and low pressures in the presence of organometal mixed catalysts known in themselves which have been obtained from halogen compounds of the metals of sub-groups 4 to 8 of the Periodic Table and metals, alloys, hydrides or organometal compounds of the elements of main or sub-groups 1 to 3 of the Periodic Table.

This finding is surprising since it has been found that the corresponding α-alkylenalkyl ethers, for example alkyl-vinyl ethers and alkylallyl ethers, are not only incapable of copolymerizing with α-olefins but also inhibit or stop the polymerization of α-olefins by damaging or destroying the organo-metal catalyst system.

In the process of the invention, α-olefins of the formula $CH_2=CHR$ may be used. In this formula, R represents a hydrogen atom or an alkyl, aryl or alkaryl group with 2 to 15 carbon atoms.

Examples of such α-olefins are ethylene, propylene, butene-(1), 3-methyl-butene-(1), 5-phenyl-pentene-(1), hexene-(1), pentene-(1), 4-phenyl-pentene-(1) and 4-phenyl-butene-(1)-styrene.

Examples of α-alkylenaryl ethers to be used in the process of the invention are 11-(2,6-dimethylphenoxy)-undecene-(1),
5-(2,6-dimethylphenoxy)-pentene-(1),
4-(2,6-dimethylphenoxy)-butene-(1),
5-phenoxypentene-(1),
4-phenoxybutene-(1),
11-(α-naphthoxy)-undecene-(1),
11-(β-naphthoxy)-undecene-(1),
4-(4-methoxy-phenoxy)-butene-(1),
5-(4-bromophenoxy)-pentene-(1),
5-(4-diethylaminophenoxy)-pentene-(1) and
3-(4-diphenyl ether)-propene-(1), 5-(α-naphthoxy)-pentene-(1), 4-(α-naphthoxy)-butene-(1).

The copolymers obtained by the process of the invention contain advantageously 99.5 to 85% by weight of α-olefins and 0.5 to 15% by weight of α-alkylenaryl ethers. They are distinguished by their good notched impact strength and only slight tendency to environmental stress cracking. They are extremely resistant to degradation under the action of ultraviolet light and thermal-oxidative degradation. They can be well injected and dyed more easily with dispersion dyes than homopolymers of propylene.

As catalysts for the manufacture of the copolymers of the invention there may be used the organometal mixed catalysts generally used for the low pressure polymerization of α-olefins. There may be used combinations of halogen compounds of the metals of sub-groups 4 to 8 of the Periodic Table, particularly $TiCl_4$, $VCl_4$, $VOCl_3$ or $CrCl_3$, with metals, alloys, hydrides or organometal compounds of the elements of groups 1 to 3 of the Periodic Table, particularly $Al(C_2H_5)_3$, $Al(C_2H_5)_2Cl$, $Al_2(C_2H_5)_3Cl_3$ or $Li(C_4H_9)$ The catalyst system is obtained by mixing 0.1 to 20 parts, advantageously 2 to 4 parts, of the reducing metal compound in an inert solvent, for example an aliphatic hydrocarbon boiling at 60 to 260° C., with a part of the transition metal compound to be reduced. It is also possible to use preformed transition metal compounds, for example $TiCl_3$ obtained by reducing $TiCl_4$ with hydrogen at high temperatures or with aluminum powder.

The catalyst mixtures which are obtained directly by the reaction of the transition element compounds with the metal organyl compounds at temperatures within the range of —20 to +100° C., advantageously —10 to +40° C., may be used as such without further purification. Advantageously they are freed, however, from undesired reaction products which may reduce the activity of the catalyst, by washing with inert aliphatic hydrocarbons. It is also possible to subject the catalyst mixtures to an aging process by heating them, for example, for 1 to 30 hours at elevated temperatures, for example 80 to 150° C. The maunfacture of the catalyst and also the polymerization must be carried out with the strict exclusion of atmospheric oxygen and moisture. For this purpose, all the reactions are carried out under very pure dry nitrogen or under a noble gas.

The reduced transition metal compounds are advantageously subsequently activated with metal organyl compounds, advantageously $Al(C_2H_5)_3$ or $Al(C_2H_5)_2Cl$. The catalyst concentration in the polymerization mixture is within the range of about 0.1 to 100 millimols of $TiCl_3$ per liter, advantageously 5 to 25 millimols of $TiCl_3$ per liter.

The copolymerization of the α-olefins and α-alkylenaryl ethers is carried out as a block or a copolymerization by adding the monomers once or several times separately one after the other or together to the dispersion of the polymerization catalyst in an aliphatic, alicyclic or aromatic hydrocarbon, for example heptane, hexane, cyclopentane, cyclohexane, toluene, chlorobenzene, anisole or well purified mineral oil fractions boiling at 160 to 260° C. The polymerization may be carried out in the mixtures of the monomers without using a solvent.

The polymerization is carried out at temperatures within the range of 30 to 150° C., advantageously 40 to 80° C., at atmospheric pressure or elevated pressure (1 to 12 atmospheres gage). The polymerization is carried out for a period of time of 0.5 to 15 hours, advantageously 2 to 8 hours, until a desired degree of polymerization has been reached. The polymerization is interrupted by adding an alcohol, for example isopropanol or n-butanol, or a ketone, for example acetone. The polymer powder is filtered off, washed several times with benzine, methanol and acetone and finally dried. It is also possible to use other methods of processing described in the literature.

The copolymers obtained by the process of the invention may be worked-up into shaped articles of any desired kind according to the methods known for olefin polymers.

The following examples serve to illustrate the invention but they are not intended to limit it thereto.

Example 1

(a) Preparation of catalyst.—89.2 cc. (=400 millimols) of ethylaluminum sesquichloride and 28.2 cc. (=200 millimols) of aluminum triethyl were dissolved in 300 cc. of a petroleum fraction boiling at 180 to 200° C. which had been scavenged with pure nitrogen and was free from water, oxygen, sulfur and olefins, and 109.6 cc. (=1000 millimols) of titanium tetrachloride were added drop by drop at 0° C. within 30 minutes. The deep red dispersion so obtained was stirred for a further 3 hours at 0° C. and subsequently heated at 110° C. for 5 hours, while stirring. The $TiCl_3$-containing precipitate obtained was diluted with 300 cc. of the above petroleum fraction.

(b) Copolymerization of 11-(2,6-dimethylphenoxy)-undecylene-(1) with propylene, carried out as a copolymerization.—Under a nitrogen atmosphere, 1.6 cc. of aluminum triethyl and 12.3 cc. (=15 millimols of $TiCl_3$) of the catalyst described under 1(a) were introduced into 1.5 liters of a petroleum fraction boiling at 180 to 200° C. (see above) and the whole was heated to 50° C., while stirring. To the dispersion so obtained 13.7 grams (=50 millimols) of 11-(2,6-dimethylphenoxy)-undecylene-(1) were added and propylene was introduced gradually as it was consumed. The amount of propylene was measured by a rotameter, about 10% of the propylene escaping as waste gas. The temperature in the polymerization vessel was maintained at 50° C. with the help of a water bath. After 3 hours the polymerization was interrupted by adding 50 cc. of n-butanol, the polymerization mixture was then stirred for 30 minutes at 50° C. and washed five times with 500 cc. of water at 50° C. which was free from oxygen. The fine colorless polymer powder was separated by filtration, washed three times with n-hexane, five times with methanol and acetone and finally dried at 70° C. in vacuo. 186 grams of crystalline polymer powder melting at 161° C. and having a viscosity $\eta_{spec}/C$ of 6.69 (determined on a 0.1% solution in decahydronaphthalene at 135° C.) were obtained. The space-time yield amounted to 52 grams per liter and per hour, 79% of which was in the form of the crystalline modification. By precipitation with 5 times the amount of acetone, 35 grams of a soft rubber-like amorphous polymer could be isolated from the mother liquor. From the acetone-containing solution 15 grams of a viscous oily polymer were obtained after evaporation in vacuo. Details of the polymerization and the properties of the copolymers obtained are indicated in Tables 1 and 2 given below.

(c) Copolymerization of 1-(2,6-dimethylphenoxy)-undecylene-(1) with propylene, carried out as a block polymerization.—The same polymerization batch as described under 1(b) was prepared and the temperature was kept at 50° C. Propylene was then introduced for 30 minutes gradually as it was consumed. The introduction of propylene was then stopped and nitrogen was introduced until all propylene that had not been consumed was removed from the polymerization vessel (about 10 minutes). Under a nitrogen atmosphere 13.7 grams (=50 millimols) of 11-(2,6-dimethylphenoxy-undecyclene-(1) were added drop by drop within 10 minutes and the whole was kept for a further 30 minutes under nitrogen. The introduction of nitrogen was then stopped and propylene was again introduced for 30 minutes. The propylene was then again expelled with nitrogen, 13.7 grams (=50 millimols) of 11-(2,6-dimethylphenoxy)-undecylene-(1) were added drop by drop, the whole was kept under nitrogen for 30 minutes and polymerization was continued for a further 2 hours, propylene being introduced in such an amount that about 10% escaped as waste gas. The polymer so obtained was processed as described under 1(b). 174 grams of a crystalline polymer powder melting at 162° C. and having a viscosity $\eta_{spec}/C$ of 6.42 (determined on a 0.1% solution in decahydronaphthalene at 135° C.) were obtained.

The space-time yield amounted to 46 grams per liter and per hour, 84% of which was in the form of the crystalline modification. From the mother liquor 33 grams of amorphous and low molecular oily polymers could be obtained.

Further details of the polymerization and the properties of the copolymer are indicated in Tables 1 and 2 given below.

Example 2

Copolymerization of 5-(2,6-dimethylphenoxy)-pentene-(1) with propylene, carried out as a copolymerization.—The polymerization batch described under 1(b) was prepared and polymerized at 50° C. To the dispersion so obtained 9.5 grams (=50 millimols) of 5-(2,6-dimethylphenoxy)-pentene-(1) were added. A gaseous mixture of 15 liters per hour of propylene and 10 liters per hour of nitrogen was then introduced for 3 hours. Subsequently, propylene was introduced for 2 hours in such an amount that about 10% of it escaped as waste gas. The polymeriaztion was interrupted and the polymer was processed as described under 1(b). 159 grams of a crystalline polymer powder melting at 159° C. and having a viscosity $\eta_{spec}/C$ of 7.07 (determined on a 0.1% solution in decahydronaphthalene at 135° C.) were obtained. The space-time yield amounted to 23 grams per liter and per hour, 92% of which was in the form of the crystalline modification. From the mother liquor 14 grams of amorphous and low molecular oily polymer were obtained.

Further details of the polymerization and the properties of the copolymer are indicated in Tables 1 and 2 given below.

Examples 3 to 10

Copolymerization of further alpha-alkylenaryl ethers with propylene.—The polymerization and the processing of the polymer were carried out as described above under 1(b) and 1(c). Particulars of the polymerization and the properties of the polymers are indicated in Tables 1 and 2 given below.

Example 11

(a) Preparation of catalyst.—490 cc. (=2.2 mols) of ethylaluminum sesquichloride were dissolved in 1.5 liters of a petroleum fraction boiling at 180 to 200° C. which had been scavenged with pure nitrogen and was free from water, oxygen, sulfur and olefin, and then a solution of 220 cc. (=2 mols) of titanium tetrachloride in 300 cc. of the above petroleum fraction boiling at 180 to 200° C. was added drop by drop at 0° C. within 3 hours. A deep red dispersion was obtained which was stirred for a further 2 hours at 0° C. and then heated at 110° C. for 5 hours, while stirring. The dispersion was then cooled to room temperature, the $TiCl_3$ precipitate formed was allowed to deposit and the supernatant clear solution was siphoned-off. The catalyst was washed about 10 times, while stirring, with fresh solvent of the above-mentioned petroleum fraction, such an amount of solvent being added each time as had been previously removed. When the wash solution which had been hydrolyzed with water was subjected to a titration, a content of 5 m. atom Cl/l. of catalyst dispersion was determined.

(b) Copolymerization of 4-(2,6-dimethylphenoxy)-butene-(1) with propylene, carried out as a copolymerization.—Under a nitrogen atmosphere 25 cc. (=20 millimols of $TiCl_3$) of the catalyst described under (a) and 4.7 cc. (=40 millimols) of diethylaluminum monochloride were introduced into 2 liters of a petroleum fraction boiling at 180 to 200° C. (see above) and the whole was heated to 50° C. 14.4 grams (=82 millimols) of 4-(2,6-dimethylphenoxy)-butene-(1) were then added to the dispersion and propylene was introduced for 5 hours gradually as it was consumed.

The polymer was processed as described in Example 1(b). 76 grams of a crystalline polymer powder were obtained. The product had a melting point of 164° C., a density of 0.9040 gram per cm.$^3$ and a viscosity $\eta_{spec}/C$ of 15.43 (determined on a 0.1% solution in decahydronaphthalene at 135° C.). The space-time yield amounted to 8.1 grams per liter and per hour, 94% of which was in the form of the crystalline modification.

From the mother liquor 5 grams of amorphous, soft rubber-like polymer were obtained.

The crystalline homopolymer of propylene prepared with the same catalyst had a crystallite melting point of 158° C. and a density of 0.9019 gram per cm.$^3$.

Example 12

Copolymerization of 5-(2,6-dimethylphenoxy)-pentene-(1) with ethylene, carried out as a copolymerization.—The copolymerization was carried out as described in Example 2, using the same catalyst. A gaseous mixture of 15 liters per hour of ethylene and 10 liters per hour of nitrogen was introduced for 5 hours. 88 grams of a crystalline polymer powder melting at 124° C. and having a viscosity $\eta_{spec}/C$ of 8.20 (determined on a 0.1% solution in decahydronaphthalene at 135° C.) were obtained. The space-time yield amounted to 12 grams per liter and per hour, 98% of which was in the form of a crystalline modification.

The crystalline polymer had a density of 0.940 gram per cm.$^3$.

Example 13

Copolymerization of 11 - (naphthoxy) - undecene - (1) with propylene.—Under a nitrogen atmosphere 25 cc. (=20 millimols of $TiCl_3$) of the catalyst described under 11(a) and 4.7 cc. (=40 millimols) of diethylaluminum monochloride were introduced into 2 liters of a petroleum fraction boiling at 180 to 200° C. (see above) and the whole was heated to 50° C. 14.8 grams (=50 millimols) of 11-(alpha-naphthoxy)-undecene-(1) were added to the dispersion and propylene was introduced for 3 hours gradually as it was consumed.

The polymer was processed as described in Example 1(b). 280 grams of a crystalline polymer powder melting at 165° C. and having a density of 0.9027 gram per cm.$^3$ and a viscosity $\eta_{spec}/C$ of 10.93 (determined on a 0.1% solution in decahydronaphthalene at 135° C.) were obtained. The space-time yield amounted to 53.3 grams per liter and per hour, 87.5% of which was in the form of the crystalline modification. The polymer contained 1.85% by weight of 11-(alpha-naphthoxy)-undecene-(1). From the mother liquor 40 grams of amorphous, soft rubber-like polymer were obtained.

Example 14

Copolymerization of 4-(alpha-naphthoxy)-butene-(1) with propylene.—Under nitrogen 25 cc. (=20 millimols of $TiCl_3$) of the catalyst described under 11(a) and 4.7 cc. (=40 millimols) of diethylaluminum monochloride were introduced into 2 liters of a petroleum fraction boiling at 180 to 200° C. (see above) and the whole was heated to 50° C. 9.9 grams (=50 millimols) of 4-(alpha-naphthoxy)-butene-(1) were added to the dispersion and propylene was introduced for 3 hours gradually as it was consumed. The polymer was processed as described in Example 1(b). 160 grams of a crystalline polymer powder were obtained. The product had a melting point of 164° C., a density of 0.9035 gram per cm.$^3$ and a viscosity $\eta_{spec}/C$ of 9.65 (determined on a 0.1% solution in decahydronaphthalene at 135° C.). The space-time yield amounted to 28.7 grams per liter and per hour, 93.0% of which was in the form of the crystalline modification. The polymer contained 1.0% by weight of 4-(alpha-naphthoxy)-butene-(1). From the mother liquor 12 grams of amorphous, soft rubber-like polymer were obtained.

Example 15

Copolymerization of 11-($\beta$-naphthoxy)-undecene-(1) with propylene, carried out as a copolymerization.—Under nitrogen 25 cc. (=20 millimols of $TiCl_3$) of the catalyst described under 11(a) and 4.7 cc. (=40 millimols) of diethylaluminum monochloride were introduced into 2 liters of absolute heptane and the whole was heated to 50° C. 7.4 grams (=25 millimols) of 11-($\beta$-naphthoxy)-undecene-(1) were added to the dispersion and propylene was introduced for 3 hours gradually as it was consumed, 10% escaping as waste gas.

The polymer was processed as described in Example 1(b). 200 grams of a crystalline polymer powder were obtained. The product had a melting point of 164° C., a density of 0.9014 gram per cm.$^3$ and a viscosity $\eta_{spec}/C$ of 9.40 (determined on a 0.1% solution in decahydronaphthalene at 135° C.). The space-time yield amounted to 35.8 grams per liter and per hour, 93.0% of which was in the form of the crystalline modification. The polymer contained 0.8% by weight of 11-($\beta$-naphthoxy)-undecene-(1).

From the mother liquor 15 grams of amorphous and low molecular oily polymers were obtained.

Example 16

Copolymerization of 5-(alpha-naphthoxy)-pentene-(1) with propylene, carried out as a copolymerization.—Under nitrogen 25 cc. (=20 millimols of $TiCl_3$) of the catalyst described under 11(a) and 4.7 cc. (=40 millimols) of diethylaluminum monochloride were introduced into 2 liters of absolute heptane and the whole was heated to 50° C. 10.6 grams (=50 millimols) of 5-(alpha-naphthoxy)-pentene-(1) was added to the dispersion and propylene was introduced for 5 hours gradually as it was consumed, 10% escaping as waste gas.

The polymer was processed as in Example 1(b). 154 grams of a crystalline polymer powder were obtained. The product had a melting point of 165° C., a density of 0.9004 gram per cm.$^3$ and viscosity $\eta_{spec}/C$ of 11.55 (determined on a 0.1% solution in decahydronaphthalene at 135° C.). The space-time yield amounted to 18.1 grams per liter and per hour, 85.1% of which was in the form of the crystalline modification. The polymer contained 2.4% by weight of 5-(alpha-naphthoxy)-pentene-(1).

From the mother liquor 27 grams of amorphous and low molecular oily polymers could be isolated.

The product was subjected to a brittle test at 140° C. Whereas a comparison sample of unstabilized polypropylene homopolymer was already completely destroyed after 12 hours (total localized embrittlement), the unstabilized product obtained by this example broke only after 888 hours without localized embrittlement.

The product has excellent electrical properties which enable it to be used in the field of electrical engineering.

TABLE 1.—COPOLYMERIZATION OF α-ALKYLENARYL ETHERS AND PROPYLENE AT 50° C. WITH 15 MILLIMOLS TiCl₃ OF THE CATALYST SYSTEM OF EXAMPLE 1(a)
[Concentration 10 millimols TiCl₃/l.]

| Ex. No. | Kind of copolymerization | Introduction of propylene | α-alkylenaryl ether [1] | Milli-mols | Polymer-ization time in hours | Crystalline copolymer G. | Crystalline copolymer Percent of total polymer | Percent by weight of ether in crystalline copolymer [2] |
|---|---|---|---|---|---|---|---|---|
| 1b | Copolymerization | Excess amount | 11-(2,6-dimethylphenoxy)-undecylene-(1) | 50 | 3 | 186 | 79 | 4.4 |
| 1c | Block polymerization | do | do | 100 | 3 | 174 | 84 | 3.5 |
| 2 | Copolymerization | Deficiency | 5-(2,6-dimethylphenoxy)-pentene-(1) | 50 | 5 | 159 | 92 | 4.1 |
| 3 | do | Excess | 4-phenoxybutene-(1) | 50 | 5 | 60 | 94 | 2.9 |
| 4 | do | do | do | 50 | [3] 5 | 140 | 97 | 1.3 |
| 5 | Block polymerization | do | do | 100 | 5 | 90 | 94 | 1.3 |
| 6 | Copolymerization | Deficiency | 5-phenoxypentene-(1) | 100 | 8 | 138 | 91 | 11.3 |
| 7 | do | Excess | 4-(4-methoxyphenoxy)-butene-(1) | 50 | 5 | 55 | 70 | 6.4 |
| 8 | do | Deficiency | 5-(4-bromophenoxy)-pentene-(1) | 50 | 7 | 165 | 91 | 14.0 |
| 9 | do | do | 5-(4-diethylaminophenoxy)-pentene-(1) | 50 | 5 | 30 | 55 | 2.7 |
| 10 | do | Excess | 3-(4-diphenyl ether)-propene-(1) | 50 | 5 | 67 | 81 | 1.8 |

[1] As far as the ethers were unknown, they were examined by elementary analysis and infrared spectroscopy.
[2] The percentage by weight of the α-alkylenaryl ethers in the copolymer was determined by infrared spectroscopy. The products were reprecipitated three times from xylene and extracted after each of these procedures for 10 hours with CCl₄ in a soxhlet.
[3] 70° C.

TABLE 2.—PROPERTIES OF THE α-ALKYLENARYL ETHER/PROPYLENE-COPOLYMERS AND OF A HOMOPOLYPROPYLENE PREPARED ACCORDING TO EXAMPLE 1(b)

| | Examples | | | | | | | | Polypropylene homopolymer |
|---|---|---|---|---|---|---|---|---|---|
| | 1b | 1c | 2 | 3 | 4 | 5 | 6 | 7 | 8 | |
| η red | 6.69 | 6.42 | 7.07 | 9.36 | 5.62 | 7.71 | 9.13 | 8.13 | 9.40 | 12.20 |
| Crystallite melting point, °C | 161 | 162 | 159 | 164 | 165 | 164 | 158 | 159 | 160 | 165 |
| Density (g./cm.³) | 0.8906 | 0.8953 | 0.8924 | 0.9002 | 0.9015 | 0.8997 | 0.8901 | 0.8944 | 0.8905 | 0.9017 |
| Notched impact strength (cm. kg./cm.²): | | | | | | | | | | |
| +20° C | 22.20 | 9.51 | 12.70 | 7.85 | 6.78 | 7.40 | 21.3 | | | 7.00 |
| −20° C | 1.53 | 1.60 | 1.70 | 1.52 | 1.43 | 1.50 | 1.73 | | | 1.88 |

We claim:

1. Copolymers of 99.5 to 85% by weight of α-olefins of the formula CH₂=CH—R, in which R represents a member selected from the group consisting of hydrogen, an alkyl group, aryl group and alkaryl group, and 0.5 to 15% by weight of an α-alkylenaryl ether selected from the group consisting of 11-(2,6-dimethylphenoxy)-undecene-(1), 5-(2,6-dimethylphenoxy)-pentene-(1), 4-(2,6-dimethylphenoxy)-butene-(1), 5-phenoxypentene-(1), 4-phenoxybutene-(1), 11-(α-naphthoxy)-undecene-(1), 11-(β-naphthoxy)-undecene-(1), 4-(4-methoxy-phenoxy)-butene-(1), 5-(4-bromophenoxy)-pentene-(1), 5-(4-diethylaminophenoxy)-pentene-(1) and 3-(4-diphenyl ether)-propene-(1), 5-(α-naphthoxy)-pentene-(1) and 4-(α-naphthoxy)-butene-(1).

2. Copolymers according to claim 1 wherein a member selected from the group consisting of propylene and ethylene is used as the α-olefin.

3. Copolymers according to claim 1 wherein the α-alkylenaryl ether is 11-(2,6-dimethylphenoxy)-undecene-(1).

4. Copolymers according to claim 1 wherein the α-alkylenaryl ether is 5-phenoxypentene-(1).

References Cited

UNITED STATES PATENTS 3,023,198  2/1962  Nowlin et al. _____ 260—88.1
3,026,290  2/1962  Gluesenkemp _____ 260—45.5
3,070,577  12/1962  Stogryn et al. _____ 260—62

OTHER REFERENCES

Breuer et al., Catalyst Systems. In Crystalline Olefin Polymers. Part I, ed. by Raff and Doak, New York. Interscience, 1965, page 56.

WILLIAM H. SHORT, *Primary Examiner.*

M. GOLDSTEIN, *Assistant Examiner.*